(12) United States Patent
Koh et al.

(10) Patent No.: US 8,486,559 B2
(45) Date of Patent: Jul. 16, 2013

(54) SECONDARY BATTERY WITH SUPPORT MEMBER FOR TERMINAL

(75) Inventors: Seok Koh, Yongin-si (KR); Nohyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 476 days.

(21) Appl. No.: 12/629,012

(22) Filed: Dec. 1, 2009

(65) Prior Publication Data

US 2010/0151280 A1    Jun. 17, 2010

(30) Foreign Application Priority Data

Dec. 11, 2008 (KR) .......... 10-2008-0125840

(51) Int. Cl.
*H01M 2/02* (2006.01)
(52) U.S. Cl.
USPC ............ 429/178; 429/7; 429/161; 429/170
(58) Field of Classification Search
CPC .................................... H01M 2/24
USPC .................... 429/7, 161, 170, 178
See application file for complete search history.

(56) References Cited

U.S. PATENT DOCUMENTS

| | | | |
|---|---|---|---|
| 5,912,092 A * | 6/1999 | Maruyama et al. | 429/96 |
| 2007/0202364 A1 | 8/2007 | Uh et al. | |
| 2008/0118820 A1 | 5/2008 | Jang et al. | |

FOREIGN PATENT DOCUMENTS

| | | |
|---|---|---|
| EP | 2 071 648 A1 | 6/2009 |
| EP | 2 073 295 A2 | 6/2009 |
| JP | 07-220700 | 8/1995 |
| JP | 2001-250519 | 9/2001 |
| JP | 2001250519 A * | 9/2001 |
| JP | 2002-231201 | 8/2002 |
| JP | 2004-171895 | 6/2004 |
| JP | 2004171895 A * | 6/2004 |
| KR | 10-2007-0096775 | 10/2007 |
| KR | 10-2008-0036737 | 4/2008 |
| KR | 10-2008-0045946 | 5/2008 |

OTHER PUBLICATIONS

European Search Report dated Feb. 19, 2010, for corresponding European Patent application 09178888.5.
Chinese Office action dated Jan. 29, 2012 issued to corresponding Chinese Patent Application No. 200910259124.0, with English translation, 11pages.
Japanese Patent Office Action dated Jun. 26, 2012 for JP 2009-279741 (2 pages).
Patent Abstracts of Japan and machine translation for Japanese Publication No. 07-220700 (9 pages), Aug. 18, 1995.

* cited by examiner

*Primary Examiner* — Zachary Best
(74) *Attorney, Agent, or Firm* — Christie, Parker & Hale, LLP

(57) ABSTRACT

A secondary battery includes a bare cell and a protection circuit module electrically connected to the bare cell. The protection circuit module includes a flexible printed circuit board including a circuit board body and a terminal-forming portion providing a first external terminal and a second external terminal and a support member to which the terminal-forming portion is attached, the support member having a support surface spaced from the circuit board body.

15 Claims, 5 Drawing Sheets

SECONDARY BATTERY WITH SUPPORT MEMBER FOR TERMINAL

CROSS-REFERENCE TO RELATED PATENT APPLICATION

This application claims priority to and the benefit of Korean Patent Application No. 10-2008-0125840 filed on Dec. 11, 2008 in the Korean Intellectual Property Office (KIPO), the entire content of which is hereby incorporated by reference.

BACKGROUND OF THE INVENTION

1. Field of the Invention

The present invention relates to a secondary battery.

2. Description of the Related Art

Rechargeable secondary batteries are largely used as a power source for portable electronic devices. At present, a pack-type battery is widely used as a secondary battery. A pack-type battery is a form of a battery with integration of a bare cell and a protection circuit module (PCM) into one unit. A pack-type secondary battery typically includes a bare cell, a protection circuit module, and an upper case. The protection circuit module is attached to one surface of the bare cell, and the upper case is attached to cover the protection circuit module.

In order to keep pace with recent trends toward continued downsizing of portable electronic devices employing secondary batteries as a power source, there is an increasing demand for a secondary battery to have a smaller size. In a conventional pack-type secondary battery, the protection circuit module employs a common printed circuit board (PCB) which may limit downsizing of the secondary battery.

SUMMARY OF THE INVENTION

Therefore, in accordance with embodiments of the present invention, a secondary battery is provided including a protection circuit module with a reduced thickness through use of a flexible printed circuit board (FPCB) to achieve downsizing of the battery.

Additionally, a secondary battery is provided including a protection circuit module using an FPCB having a terminal structure firmly connected to a battery charger or external load.

In one embodiment, a secondary battery is provided including a bare cell and a protection circuit module electrically connected to the bare cell. The protection circuit module includes a flexible printed circuit board including a circuit board body and a terminal-forming portion providing a first external terminal and a second external terminal and a support member to which the terminal-forming portion is attached, the support member having a support surface spaced from the circuit board body.

The support member may include a support plate having the support surface, and a plurality of support legs extending from the support plate and fixed to the circuit board body. Further, ends of the support legs of the support member have a contact surface in contact with the circuit board body. The protection circuit module may include circuit elements mounted on the circuit board body, the circuit elements occupying a space between the support plate and the circuit board body, and the space may have a depth of at least 0.6 mm.

In one embodiment, the circuit board includes a connecting portion between the circuit board body and the terminal-forming portion, and the circuit board body is a lengthwise-extending strip having a the connecting portion extending from a side or an end of the circuit board body.

The support member may be fixed to the circuit board by soldering, adhesion or a surface mount technology process, and the support member may be made of metal or an injection-molded synthetic resin. Further, the support surface of the support member may be insulation-treated, such as with an insulating tape.

Further, the terminal-forming portion may be attached to the support surface of the support member, such as by a double-sided tape. Additionally, the circuit board may include an upper surface having circuit elements mounted thereon, and a lower surface opposite to the upper surface on which the first external terminal and the second external terminal are mounted.

DETAILED DESCRIPTION

Hereinafter, embodiments of the present invention will be described in more detail with reference to the accompanying drawings.

Figure 1:
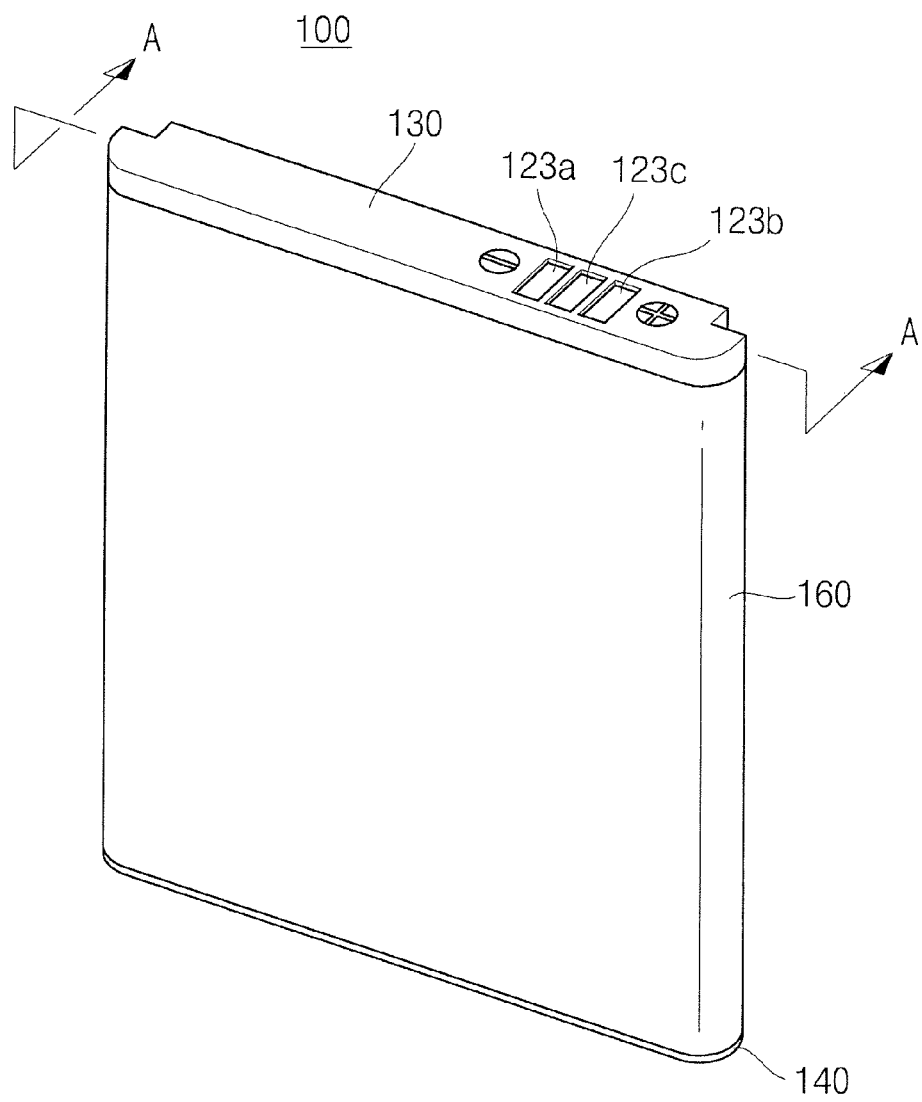
FIG. 1 is a perspective view of a secondary battery in accordance with one embodiment of the present invention.
Figure 2:
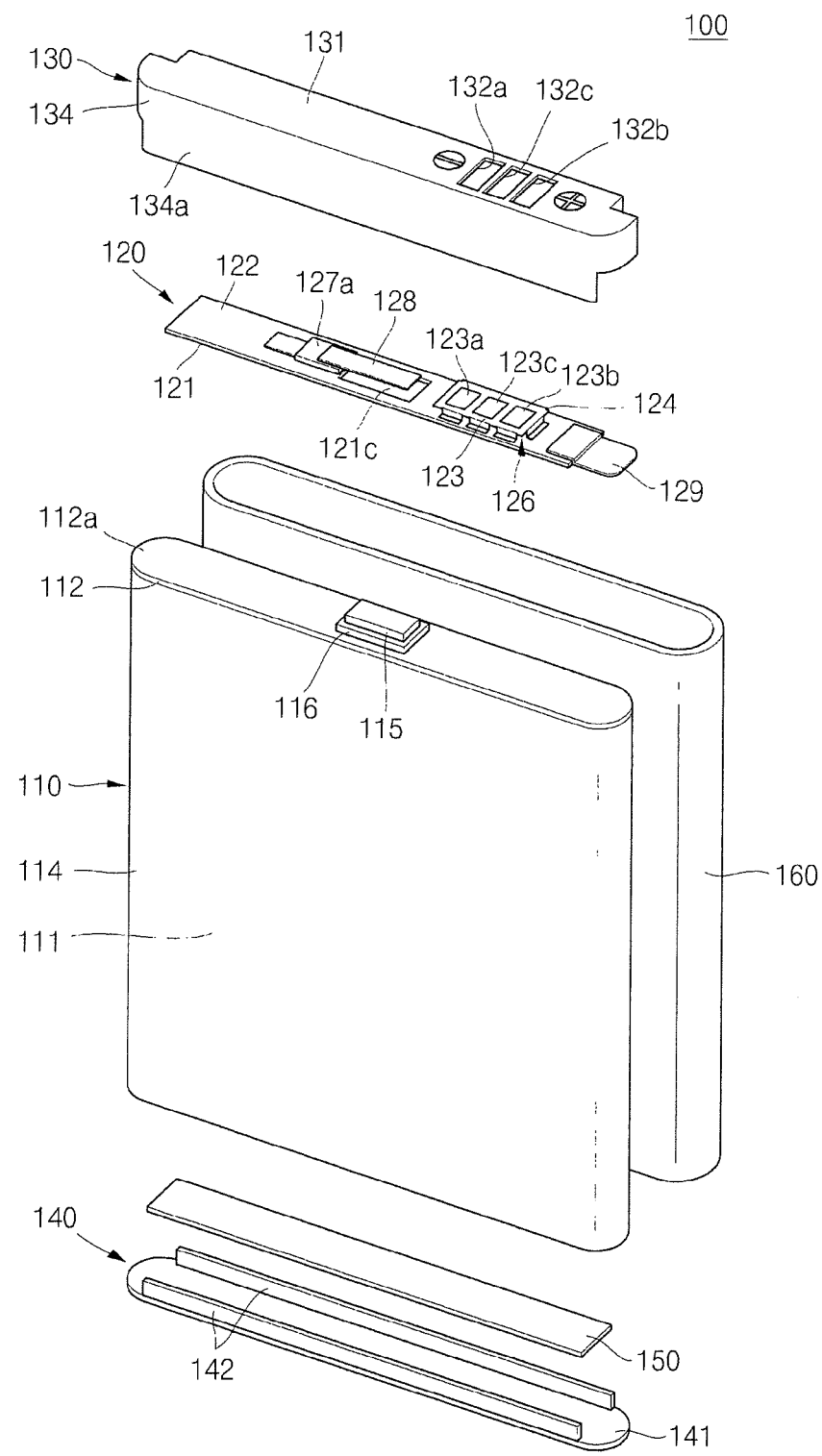
FIG. 2 is an exploded perspective view of the secondary battery shown in FIG. 1.
Figure 3:
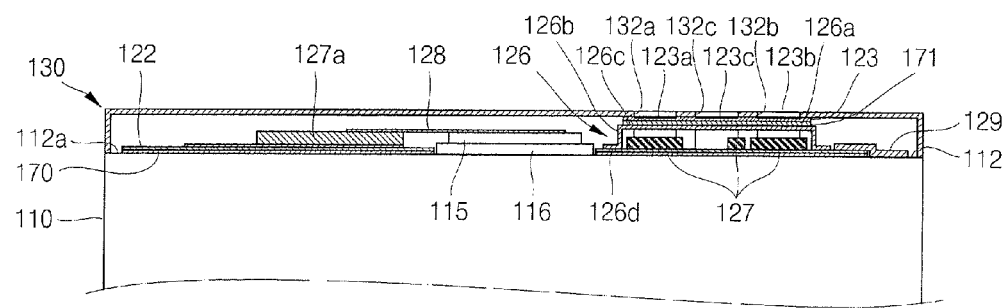
FIG. 3 is a cross-sectional view of an upper part of a bare cell of the secondary battery shown in FIG. 1 taken along the line A-A.
Figure 4A:
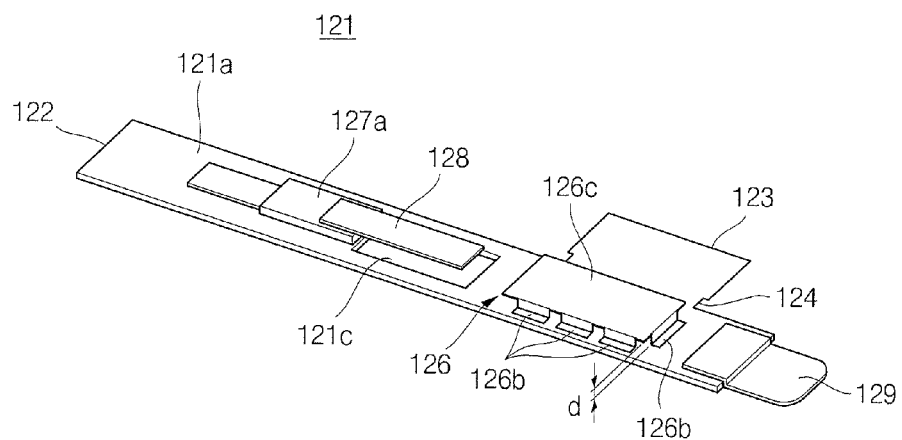
FIGS. 4A and 4B are top and bottom perspective views, respectively, of a protection circuit module shown in FIG. 2 with an unfolded terminal-forming portion.
Figure 4B:
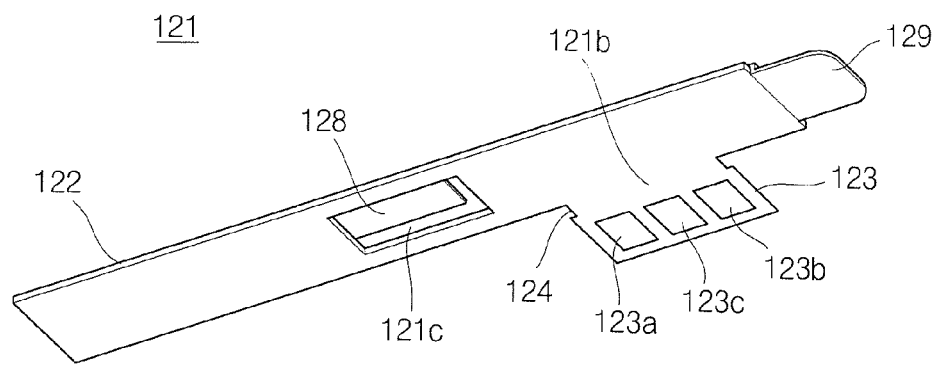
Figure 5:
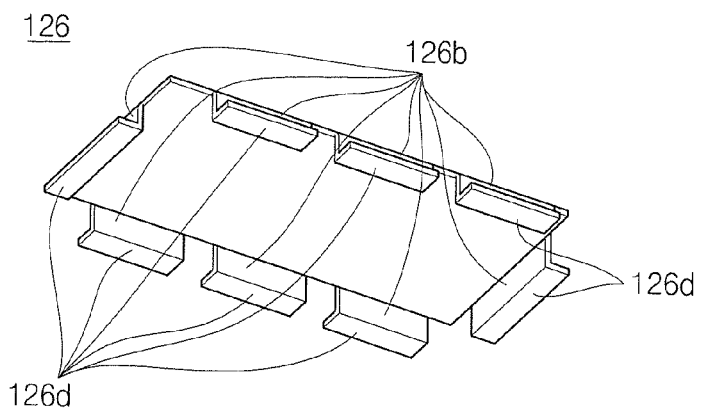
FIG. 5 is a bottom perspective view of a support member of an embodiment of the present invention.

FIG. 1 is a perspective view of a secondary battery in accordance with one embodiment of the present invention. FIG. 2 is an exploded perspective view of the secondary battery of FIG. 1. FIG. 3 is a cross-sectional view of an upper part of a bare cell taken along the line A-A of FIG. 1. FIGS. 4A and 4B are top and bottom perspective views, respectively, of the protection circuit module shown in FIG. 2 with an unfolded terminal-forming portion. FIG. 5 is a perspective view of a support member shown in FIG. 4A.

Referring to FIGS. 1 to 5, a secondary battery 100 includes a bare cell 110, a protection circuit module (PCM) 120, and an upper case 130. The secondary battery 100 may further include a lower case 140, an adhesive member 150, and a label 160.

The PCM 120 of the secondary battery 100 includes a circuit board 121 formed of an FPCB, and a terminal-forming portion 123 of the circuit board 121 is supported by a support member 126 to thereby reduce or prevent the terminal-forming portion 123 from being pushed further toward the cap assembly 112 when a battery charger or external load is connected thereto, thus providing good maintenance of an electrical connection state.

The bare cell 110 supplies electrical energy and includes an electrode assembly having a positive electrode, a negative electrode and a separator disposed therebetween, a can 111 made of metal for housing the electrode assembly and an electrolyte, and a cap assembly 112 for sealing an open part of the can 111. The cap assembly 112 includes a cap plate 112a formed of metal, a first electrode terminal 115 protruding from the cap plate 112a, and a gasket 116 disposed between the cap plate 112a and the first electrode terminal 115 to provide electrical insulation therebetween. The present embodiment will illustrate a structural configuration where the first electrode terminal 115 functions as a negative electrode terminal.

The can 111 and the cap plate 112a will work as a second electrode terminal. The present embodiment will illustrate a structural configuration where the can 111 and the cap plate 112a serve as a positive electrode terminal. Although the present embodiment has the structure where the first electrode terminal 115 acts as a negative electrode, and the can 111 and the cap plate 112a act as a positive electrode, the present invention is not limited thereto. Those skilled in the art will appreciate that an alternative form is also possible wherein the first electrode terminal 115 is a positive electrode, and the can 111 and the cap plate 112a is a negative electrode.

The PCM 120 includes the circuit board 121, and the support member 126, a plurality of circuit elements 127, a first electrode lead plate 128, and a second electrode lead plate 129 mounted on the circuit board 121. The PCM 120 controls the overall operations including charge/discharge of the secondary battery 100.

In one embodiment, the circuit board 121 is an FPCB having a wiring pattern and a thickness of about 0.1 mm. The circuit board 121 includes a circuit board body 122, a terminal-forming portion 123, and a connecting portion 124.

In one embodiment, the body 122 of the circuit board 121 is in the form of a lengthwise-extending generally rectangular strip. At the center of the body 122 is provided a through-hole 121c. The gasket 116 and first electrode terminal 115 of the bare cell 110 are positioned to correspond to the through-hole 121c. An upper surface 121a of the body 122 of the circuit board 121 is provided with the support member 126, a plurality of circuit elements 127, and a first electrode lead plate 128. A lower surface 121b of the body 122 is attached to the cap plate 112a of the bare cell 110 by an adhesive layer 170 formed with an adhesive means such as a double-sided tape or adhesive.

The terminal-forming portion 123 of the circuit board 121 is connected to the body 122 via the connecting portion 124 extending from a side surface of the body 122. The lower surface 121b of the terminal-forming portion 123 is provided with a first external terminal 123a serving as a negative electrode terminal, a second external terminal 123b serving as a positive electrode terminal, and a third external terminal 123c serving as an auxiliary control terminal. The terminal-forming portion 123 is disposed on a support surface 126c formed in the support member 126, whereby the first, second, and third external terminals 123a, 123b, 123c provided on the lower surface 121b of the terminal-forming portion 123 face upward away from the cap assembly 112. The terminal-forming portion 123 is supported by the support member 126 such that the terminal-forming portion 123 is not pushed toward the body 122 upon connection to an external device. Therefore, a good contact state is maintained between the first, second and third external terminals 123a, 123b, 123c of the terminal-forming portion 123 and a battery charger or external load.

The connecting portion 124 of the circuit board 121 extends outward from a side surface of the body 122 of the circuit board 121. The connecting portion 124 of the circuit board 121 connects between the body 122 and the terminal-forming portion 123 and allows the terminal-forming portion 123 to be attached to the support member 126.

The support member 126 is made of metal and includes a support plate 126a and a plurality of support legs 126b. The support member 126 supports the terminal-forming portion 123 of the circuit board 121 and protects the plurality of circuit elements 127 positioned therein.

The support plate 126a is provided with the support surface 126c on which the terminal-forming portion 123 of the circuit board 121 is placed. The support surface 126c of the support member 126 and the terminal-forming portion 123 of the circuit board 121 are attached to each other via an adhesive layer 171 formed by an adhesive means such as a double-sided tape or adhesive. There is no particular limit to the size and shape of the support surface 126c, as long as the first, second and third external terminals 123a, 123b, 123c of the terminal-forming portion 123 can be positioned on the support surface 126c. The support plate 126a is spaced at a given distance from the body 122 of the circuit board 121 to allow circuit elements to be inserted between the support plate 126a and the circuit board body 122. Thus, the plurality of circuit elements 127 are protected by being in a space defined between the support plate 126a of the support member 126 and the body 122 of the circuit board 121. A space (d) between the support plate 126a of the support member 126 and the body 122 of the circuit board 121 may be at least 0.6 mm so as to provide a space where a plurality of circuit elements 127 can be positioned.

The plurality of support legs 126b are formed extending from the outer periphery of the support plate 126a in the opposite direction of the support surface 126c. Ends of the support legs 126b are provided with contact surfaces 126d formed with outward bending. The contact surfaces 126d are in contact with the upper surface 121a of the body 122 and fixed to the circuit board 121. The support member 126 may be soldered or adhesively attached to the body 122 of the circuit board 121 or otherwise may be mounted by a conventional Surface Mount Technology (SMT) process.

An outer surface of the support member 126 is insulation treated such that the support member 126 can be electrically isolated from the circuit board 121 and the circuit elements 127. The insulation treatment may be made by, for example, formation of a parylene coating layer, urethane coating layer, Teflon coating layer or UV coating layer, or by an anodizing process when the support member 126 is formed of aluminum.

Although the present embodiment is illustrated for the support member 126 made of metal, the present invention is not limited thereto. For example, the support member 126 may also be formed of an injection-molded product of a synthetic resin or another similarly rigid material.

A plurality of circuit elements 127 are mounted on the upper surface 121a of the body 122 of the circuit board 121. The plurality of circuit elements 127 are protected by being covered by the support plate 126a of the support member 126. The circuit elements 127 may include a control integrated circuit (IC), a charge/discharge switching element and other passive devices.

The first electrode lead plate 128 is formed of a conductive material. The first electrode lead plate 128 is electrically connected to the circuit board 121 through a positive temperature coefficient (PTC) device 127a that can shut down a flow of electric current upon overheating of the battery, and is electrically connected to the first electrode terminal 115 serving as a negative electrode terminal of the bare cell 110 by a conventional method such as welding. The first electrode lead plate 128 and the PTC device 127a are positioned on the upper surface 121a of the body 122 of the circuit board 121.

The second electrode lead plate 129 is attached to protrude outward from one end of the body 122 of the circuit board 121. The second electrode lead plate 129 is formed of a conductive material and therefore provides electrical connection between the circuit board 121 and the cap plate 112a serving as a positive electrode terminal of the bare cell 110.

The upper case 130 is provided with a cover plate 131 and a side wall 134 which extends downward from the cover plate 131 toward the cap assembly 112. The upper case 130 accommodates the PCM 120 in an internal space thereof to thereby protect the PCM 120.

The cover plate 131 generally conforms to the cap plate 112a of the bare cell 110 and covers the PCM 120. The cover plate 131 is provided with first, second, and third terminal holes 132a, 132b, 132c formed in each region corresponding to first, second, and third external terminals 123a, 123b, 123c of the circuit board 121. The first terminal hole 132a at least partially exposes the first external terminal 123a provided on the circuit board 121, the second terminal hole 132b at least partially exposes the second external terminal 123b provided on the circuit board 121, and the third terminal hole 132c at least partially exposes the third external terminal 123c provided on the circuit board 121.

The side wall 134 is formed extending downward from the outer periphery of the cover plate 131. The side wall 134 is provided with an extension portion 134a to enclose an upper part of the side surface 113 of the bare cell 110.

The lower case 140 is provided with a bottom plate 141 and two extension portions 142 extending upward from the bottom plate 141. The bottom plate 141 generally conforms to a lower surface 113 of the bare cell 110, and is attached to the lower surface 113 of the bare cell 110 by means of the adhesive member 150. The two extension portions 142 enclose a lower part of a side surface 114 of the bare cell 110.

The label 160 is attached to enclose the side surface 114 of the bare cell 110. Further, the label 160 is attached to the extension portion 134a of the upper case 130 and the extension portion 142 of the lower case 140, such that the bare cell 110, the upper case 130 and the lower case 140 of the secondary battery 100 are firmly connected to one another.

Figure 6:
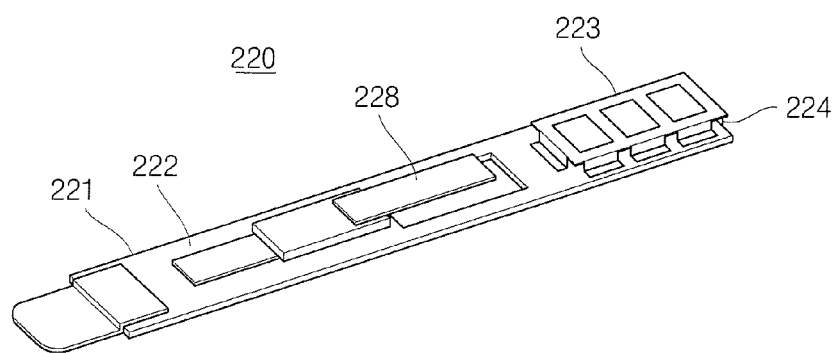
FIG. 6 is a perspective view of a protection circuit module in accordance with another embodiment of the present invention.
Figure 7:
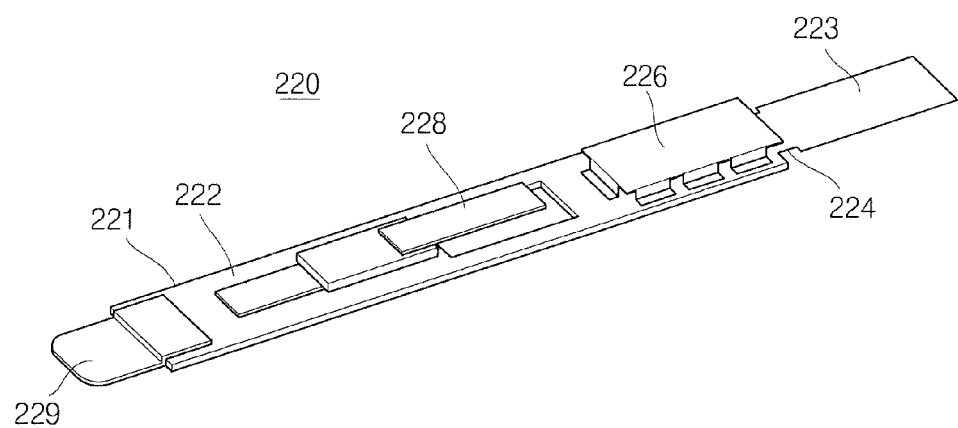
FIG. 7 is a top perspective view of the protection circuit module shown in FIG. 6 with an unfolded terminal-forming portion.

Hereinafter, a protection circuit module in accordance with another embodiment of the present invention will be illustrated. FIG. 6 is a perspective view of a protection circuit module in accordance with another embodiment of the present invention, and FIG. 7 is a perspective view of the protection circuit module shown in FIG. 6 with an unfolded terminal-forming portion. Referring to FIGS. 6 and 7, a protection circuit module 220 includes a protection circuit board 221 and a support member 226, a plurality of circuit elements, a first electrode lead plate 228, and a second electrode lead plate 229 mounted on the circuit board 221.

The circuit board 221 includes a circuit board body 222, a terminal-forming portion 223, and a connecting portion 224. The terminal-forming portion 223 is connected to the body 222 by a connecting portion 224 extending from one lengthwise end of the body 222. The terminal-forming portion 223 is formed extending along the length direction of the body 222. In this case, the circuit board 221 generally has a simple rectangular strip shape, which facilitates fabrication and workability thereof. The remaining configuration and operation of the protection circuit module 220 are substantially the same as those described with respect to the previous embodiments of FIGS. 1 to 5, so details thereof will be omitted herein.

As apparent from the above description, the configuration of the present invention enables the present invention. Specifically, a size of a secondary battery can be reduced through configuration of a protection circuit module using a thin FPCB.

Further, due to installation of a support member for supporting external terminals formed on the FPCB, the external terminals are not displaced, resulting in robust connection with a battery charger or external load.

In addition, numerous circuit elements mounted on the FPCB are positioned inside and protected by the support member, and safety of the protection circuit module is therefore improved.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    a bare cell; and
    a protection circuit module electrically connected to the bare cell, the protection circuit module comprising:
        a flexible printed circuit board including a circuit board body and a terminal-forming portion having a first external terminal and a second external terminal; and
        a support member coupled to the terminal-forming portion, the support member comprising a support plate having a support surface spaced from the circuit board body and a plurality of support legs extending from the support plate and directly contacting and fixed to the circuit board body, wherein each of the support legs comprises an extension portion extending generally away from the support plate and a contact portion bent from the extending portion and configured to be fixed to the circuit board body.

2. The secondary battery according to claim 1, wherein the protection circuit module includes circuit elements mounted on the circuit board body, the circuit elements located between the support plate and the circuit board body.

3. The secondary battery according to claim 2, wherein a distance between the support plate and the circuit board body is at least 0.6 mm.

4. The secondary battery according to claim 1, wherein the circuit board includes a connecting portion between the circuit board body and the terminal-forming portion.

5. The secondary battery according to claim 4, wherein the circuit board body is a lengthwise-extending strip.

6. The secondary battery according to claim 4, wherein the connecting portion of the circuit board extends from a side of the circuit board body.

7. The secondary battery according to claim 4, wherein the connecting portion of the circuit board extends from an end of the circuit board body.

8. The secondary battery according to claim 1, wherein the support member is fixed to the circuit board by soldering, adhesion or a surface mount technology process.

9. The secondary battery according to claim 1, wherein the support member comprises metal.

10. The secondary battery according to claim 9, wherein the support surface of the support member is insulation-treated.

11. The secondary battery according to claim 10, wherein an insulating tape is attached to the support surface of the support member.

12. The secondary battery according to claim 1, wherein the support member is formed of an injection-molded synthetic resin.

13. The secondary battery according to claim 1, wherein the terminal-forming portion is attached to the support surface of the support member.

14. The secondary battery according to claim 13, wherein the support surface and the terminal-forming portion of the circuit board are attached to each other by a double-sided tape.

15. The secondary battery according to claim 1, wherein the circuit board includes an upper surface having circuit elements mounted thereon, and a lower surface opposite to the upper surface on which the first external terminal and the second external terminal are mounted.

* * * * *